(12) United States Patent
Kopaniky et al.

(10) Patent No.: US 11,030,643 B2
(45) Date of Patent: Jun. 8, 2021

(54) LOCATION-SPECIFIC DIGITAL MEDIA ADVERTISING

(71) Applicant: Reflect Systems, Inc., Richardson, TX (US)

(72) Inventors: David Allen Kopaniky, Garland, TX (US); Adam Lockhart, Dallas, TX (US)

(73) Assignee: REFLECT SYSTEMS, INC., Richardson, TX (US)

( * ) Notice: Subject to any disclaimer, the term of this patent is extended or adjusted under 35 U.S.C. 154(b) by 228 days.

(21) Appl. No.: 15/975,241

(22) Filed: May 9, 2018

(65) Prior Publication Data

US 2018/0330399 A1 Nov. 15, 2018

Related U.S. Application Data

(60) Provisional application No. 62/504,368, filed on May 10, 2017.

(51) Int. Cl.
*G06Q 30/02* (2012.01)
*H04N 21/262* (2011.01)

(52) U.S. Cl.
CPC ..... *G06Q 30/0244* (2013.01); *G06Q 30/0246* (2013.01); *G06Q 30/0277* (2013.01); *H04N 21/26241* (2013.01)

(58) Field of Classification Search
CPC .......... G06Q 30/0244; G06Q 30/0246; G06Q 30/0277; H04N 21/26241
See application file for complete search history.

(56) References Cited

U.S. PATENT DOCUMENTS

| 9,369,777 | B2 * | 6/2016 | Haberman | G06Q 30/0241 |
| 2009/0217084 | A1 * | 8/2009 | Ebbert | G06F 3/1454 |
| | | | | 714/5.1 |
| 2014/0337137 | A1 * | 11/2014 | Robertson | H04M 3/48 |
| | | | | 705/14.61 |
| 2017/0208370 | A1 * | 7/2017 | Ray | H04N 21/2385 |

OTHER PUBLICATIONS

Resource-Efficient Mobile Multimedia Streaming With Adaptive Network Selection Joohyun Lee, Member, IEEE, Kyunghan Lee, Member, IEEE, Choongwoo Han, Taehoon Kim, and Song Chong, Member, IEEE IEEE Transactions on Multimedia, vol. 18, No. 12, Dec. 2016 (Year: 2016).*

* cited by examiner

*Primary Examiner* — Alexandru Cirnu
(74) *Attorney, Agent, or Firm* — Katten Muchin Rosenman LLP

(57) ABSTRACT

A networked computerized advertising system used for integrating, processing and displaying location-based advertising information is provided. The system comprises at least one computing device, and a network that connects the computing device with multiple playback endpoints. The computing device includes a data storage subsystem component that stores information about the multiple end points, a data entry subsystem component that allows input of the information about the multiple end points, and a data analytics component programmed to process the information about the multiple end points and compute optimal advertising playback plans for each endpoint. Playbacks at endpoints are continuously monitored, and the playback plans are repeatedly reconstructed to provide flexible advertising campaigns to be customized in accordance with the schedule and the operations of the host business.

28 Claims, 11 Drawing Sheets

LOCATION-SPECIFIC DIGITAL MEDIA ADVERTISING

RELATED APPLICATIONS

This application claims priority of U.S. Provisional Application Ser. No. 62/504,368, entitled "LOCATION-SPECIFIC DIGITAL MEDIA ADVERTISING" filed on May 10, 2017, and herein incorporated by reference in its entirety.

TECHNICAL FIELD

The presently disclosed subject matter relates to a location-specific advertising system. In particular, the presently disclosed subject matter relates to an out-of-home advertising system that accounts for the operations of the host of the advertisements.

BACKGROUND

Conventional systems for providing advertisement of commercial content offer solutions that are incomplete at best, and outdated and inefficient in most cases. Namely, existing solutions are time-linear, and only succeed in even delivery of playbacks under very limited circumstances. Suitable environment is reduced to instances where endpoints are always available, i.e., when they never stop the playback and when the audience is always the same, that is, when the audience is accounted for as watching 24 hours a day at the same rate across that time.

The likelihood of occurrence of the above two circumstances are very low under real world conditions, especially considering that endpoints are seldom always available. In many retail circumstances, for example, the stores close daily and the media endpoints are turned off. At the same time, the audience fluctuates. When stores are closed, the store displays are not exposed to visitors, even if the endpoint is on. In hospitality situations where endpoints are more likely to be available all day, the viewing audience waxes and wanes predictably with the time.

Currently existing systems respond to media playback endpoint outages identically, whether they occur unpredictably in a hardware or software failure, or predictably nightly. The conventional systems address such incidents by playing back faster, and in some cases as fast as possible, to "catch up" to where they linearly should be in a ratio of impressions or playbacks to time. This tends to overemphasize the beginning of every playback day with a higher rate of advertising than is ideal and is not aligned with an objective of presenting the advertised content to as many prospective consumers as possible.

In cases where venues are closed for multiple days in a row, opening on weekends only, for example, these systems often are unable to catch up, never intercepting the number of playbacks their linear rate demands after the first playback gap.

In light of the discussed inadequacies of the existing technology, there is a need for an advertising system and technique that is capable of providing flexible advertising campaigns to be customized in accordance with the schedule and the operations of the host business.

SUMMARY

The presently disclosed subject matter relates to an advertising system, which is a system used for integrating and processing location-based advertising information. In one embodiment, an advertising system coupled to a plurality of media playback endpoints to process advertising is provided. The advertising system comprises at least one computing device that includes a memory to store a computer executable instruction and a processor to execute the computer executable instruction that causes said at least one computing device to perform operations to process the advertising to the media playback endpoints. The operations include steps of setting a user request for the advertising at the media playback endpoints, constructing an optimal playback plan for the advertising according to the user request, compelling the media playback endpoints to execute playbacks of advertising according to the optimal playback plan, evaluating playbacks of the advertising at the media playback endpoints, reconstructing the optimal playback plan based on a result of said evaluating playbacks, and re-compelling the media playback endpoints to execute playbacks of advertising according to the reconstructed optimal playback plan.

The user request may include a target set of media playback endpoints, a targeted date-time range for each endpoint of the target set of media playback endpoints, an impression weight for each endpoint of the target set of media playback endpoints, and a media element for each endpoint of the target set of media playback endpoints. The optimal playback plan may include an optimal rate of playback at each endpoint of the media playback endpoints.

The step of evaluating playbacks may further comprise receiving reports of playbacks from the media playback endpoints, the reports including actual rates of playbacks and timings of playbacks. The evaluating playbacks may further comprise continuously measuring a gap in which playback of advertising fails at each of the media playback endpoints.

The evaluating playbacks may further comprise collecting and storing weighting statistics data including future audience measurements and future availabilities of the media playback endpoints. The weighting statistics data may further include weather forecast, local household income data, population density statistics, tourism rates, local demographic information, or combination thereof. The collecting the weighting statistics data may be performed by manual data entry, automatically imported data, predictive regression model, physical or optical sensor, counters, external machine learning systems, or combination thereof. The at least one computing device may further include a secondary storage in which the weighting statistics data is stored.

Evaluating playbacks may further comprise computing a projected future availability of each of the media playback endpoints, computing a projected impression weight of each of the media playback endpoints, computing a remaining advertising playback timespan of each of the media playback endpoints, and storing the projected future availability and the projected impression weight as a function of the remaining advertising playback timespan. The evaluating playbacks may further comprise repeating said computing and storing the projected future availability and the projected impression weight at a predetermined time interval. The reconstructing the optimal playback plan may utilize the projected future availability and the projected impression weight to reconstruct the optimal plan.

In another embodiment, a method for processing advertising to a plurality of media playback endpoints is provided. The method includes setting a user request for the advertising at the media playback endpoints, constructing an optimal playback plan for the advertising according to the user request, compelling the media playback endpoints to execute playbacks of advertising according to the optimal playback plan, evaluating playbacks of the advertising at the media playback endpoints, and reconstructing the optimal playback plan based on a result of said evaluating playbacks, and re-compelling the media playback endpoints to execute playbacks of advertising according to the reconstructed optimal playback plan.

In still another embodiment, a method for processing advertising to a plurality of media playback endpoints according to an input request is provided. The method includes collecting a request for an advertising playback for a targeted media playback endpoint, comparing the request with a point attribute of the targeted media playback endpoint, constructing an intersected confirmed request from the request, wherein the intersected confirmed request matches the point attribute of the targeted media playback endpoint, constructing an optimal playback plan for the advertising according to the intersected confirmed request, and compelling the targeted media playback endpoint to execute playbacks of advertising according to the optimal playback plan.

In still another embodiment, a method for processing advertising to a plurality of media playback endpoints according to an endpoint request is provided. The method includes receiving a request from an endpoint of the medial playback endpoints, wherein the request includes a target impression weight, setting weighting statistics data of the endpoint, which match selected options of the request at a time when the request is received, as a request weight, determining a progress of the request, determining a weighted progress of the request from the progress of the request and the target impression weight, determining delivered request weight, and setting the request as a candidate for playback if the weighted progress is less than the delivered request weight.

DETAILED DESCRIPTION

The presently disclosed subject matter provides an advertising system with an even and steady rate of playback for campaign based digital advertising in out-of-home physical venues. One embodiment of the disclosed system computes an optimal rate of playback for advertising content to deliver exactly the number of viewer impressions requested by a user. The advertising may be displayed across one or more location-based digital media playback networks selected by a user, and across one or more timespans specified by the user. The displaying rate may be adjusted as evenly as possible across those timespans, taking into account available foreknowledge of audience measurement and availability of playback endpoints during those timespans.

In one embodiment, the advertising system facilitates the continuous execution of a rate of playback for advertising content on one or more location-based digital media playback networks as close to the computed optimal rate as possible for all advertising content. The system may further adjust to hardware and software failures inherently anticipated in heterogeneous networks of location-based media player devices as they arise. A re-computation of the new optimal rate of playback may be performed as often as necessary for the advertising content in response to conditions presented by the actual rates and timings of playback of advertising content, to balance out the failures inherently anticipated in heterogeneous networks of location-based media player devices evenly across operational devices where possible. The re-computing of the new optimal rate of playback may occur as often as necessary for all advertising content in response to changes in available foreknowledge of audience measurement or availability of playback endpoints.

Figure 1:
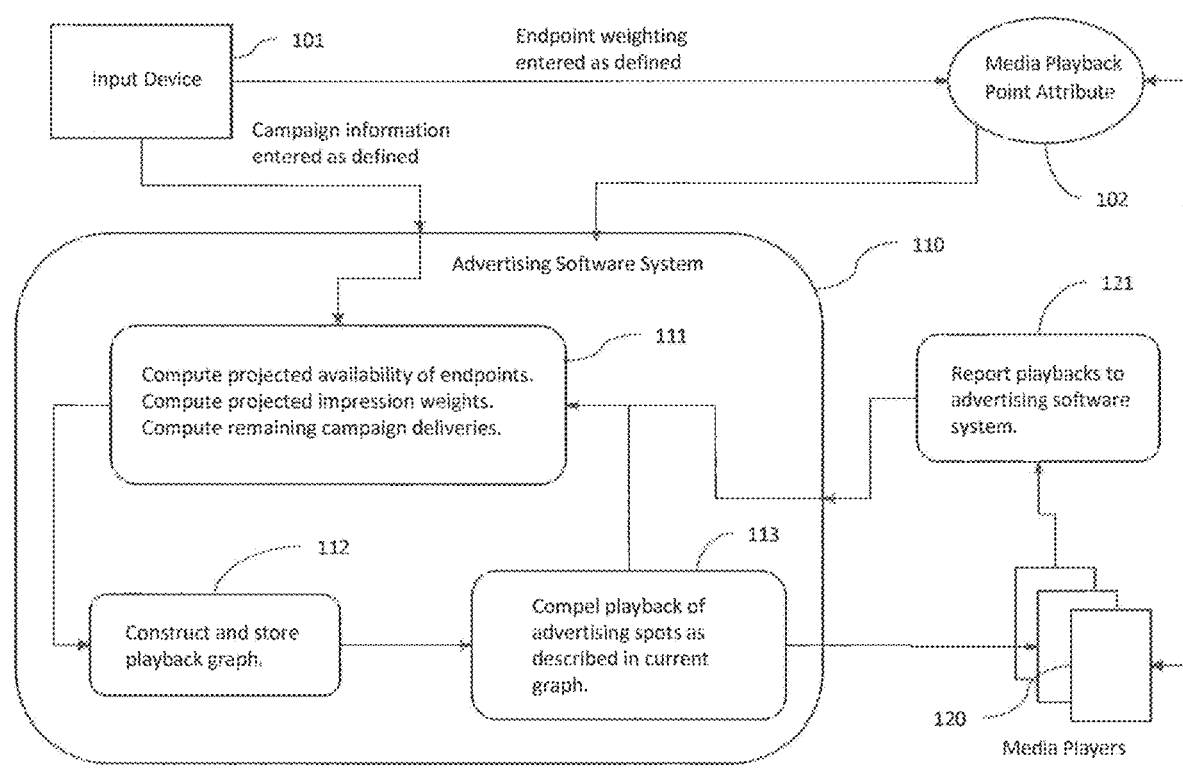
FIG. 1 shows a diagram of an advertising software system of the present invention.
Figure 2:
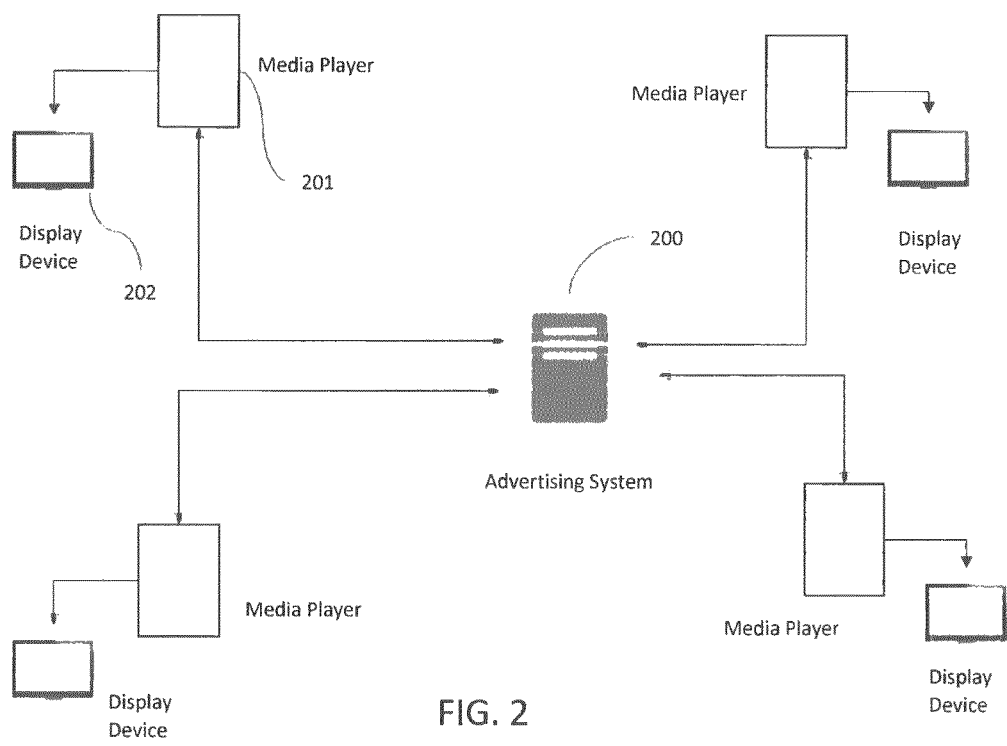
FIG. 2 shows a diagram of a location-based digital media network of the present invention.

FIG. 1 shows a diagram of an advertising software system, and FIG. 2 shows a diagram of a location-based digital media network of the advertising system. Referring to FIGS. 1 and 2, the advertising system 200 is coupled to multiple media players 201, each of which is connected to a display device 202 to display adverting contents to audience. The media players 201 is coupled to the advertising system 200 through networks such as interne or intranet. The media players 201 may be connected to the advertising system 200 wirelessly or through cables. The media player 201 represents a media playback endpoint at which advertising is executed.

Figure 10:
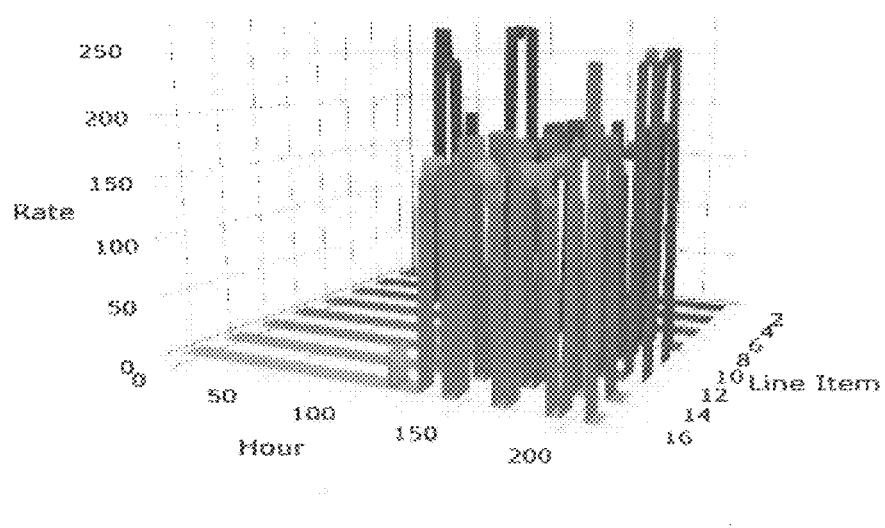
FIG. 10 is an exemplary graph showing constructed rates of playbacks based on line items (playback endpoints) and timespan.

The advertising system 200 includes an advertising software system 110 that may include a set of software systems and/or software modules which collects and stores relevant data on future audience measurement or other weighting statistics and future availability of media playback endpoints. The software system set may collect and store user requests for a number of audience viewer impressions weight worth of advertising playback across one or more place-based digital media playback networks, across one or more timespans. A series of graphs intersecting the future projected availability and impression weight of each targeted media playback endpoint with the remaining advertising playback timespans may be constructed as often as necessary. The graph shown in FIG. 10 is an example of the series of graphs. In this graph, rates of playbacks are constructed as a function of timespan according to the optimal playback plans for line items (playback endpoints).

The graphs may be used to construct the optimal playback plan for each advertisement across all remaining advertising playback timespans. The advertising system may compel one or more digital media playback networks (or endpoints) to execute playback against the computed optimal playback plans. Moreover, the system may continuously measure and compensate for gaps generated by unpredictable failures inherently anticipated in heterogeneous networks of place-based media player devices by re-computing the optimal playback plans and compelling the affected digital media playback networks to executed playback against the newly computed plans. The system may provide flexibility to enable and disable this behavior, as well as modify its parameters, as desired to achieve a range of effective output behaviors using the same technology.

In implementation, the system may be composed of several separate, but interrelated pieces of software that act together to carry out the complete solution. Users may interact with the software components or modules to assign information about playback networks as described herein to configure the system. Once the system is configured, users may use a graphic software interface to enter advertising campaign information for each advertising campaign that is to be executed. Once entered, the system may take over execution of the advertising campaign and automatically executes the intended actions as described herein.

Figure 3:
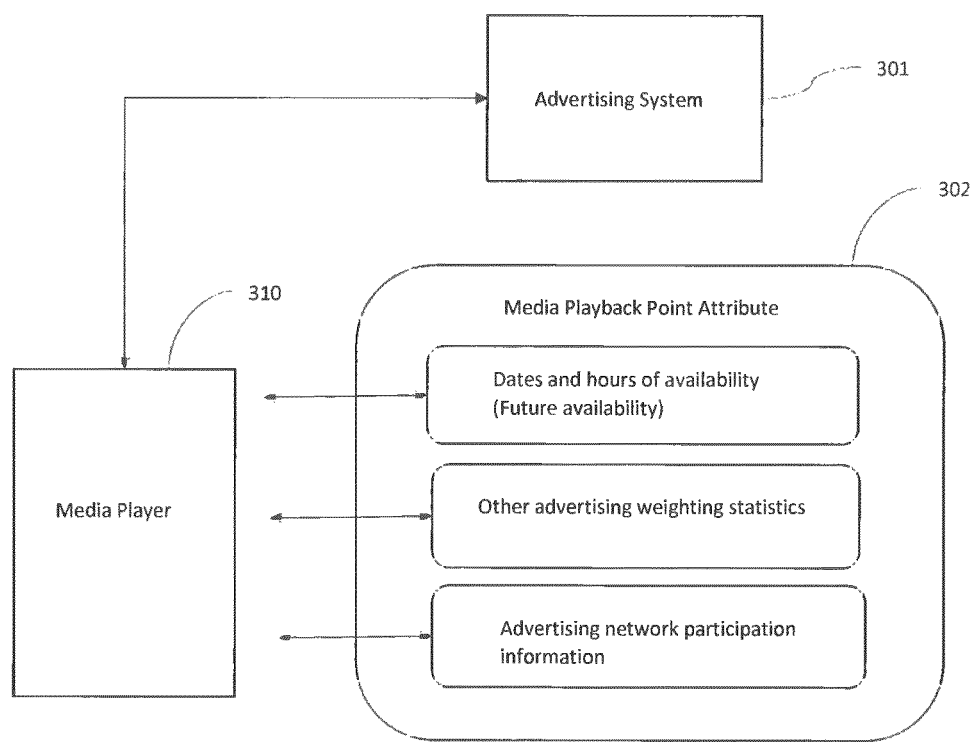
FIG. 3 shows a diagram of media playback point attributes of the present invention.

Referring to FIG. 1, campaign information necessary to construct an optimal playback plan for each endpoint may be entered through the input device 101 of the advertising system 200. This campaign information is transferred to the advertising software system 110. The user requests, which may be input through the input device 101, is also transferred or saved in the media playback point attribute 102. The media playback point attribute may be transferred to the advertising software system 110, and may be used to construct the optimal playback plan. The media playback point attribute includes information such as date and hours of availability (future availability), advertising weighting statistics and/or advertising network participation information, as shown in FIG. 3. A software module 111 receives the information from the input device 101 and media playback point attribute 102, and computes data that is necessary to build the optimal playback plan. The data may include projected availability of endpoints, projected impression weights and remaining campaign deliveries.

Another software module 112 uses the results computed in the software module 111 to construct and store a playback graph that may represent the optimal playback plan including optimal rate of playbacks. Once the playback plan is constructed, another software module 113 compels playback of advertising at media players 120, as recorded in the current playback plan. The current playback plan is also transferred to the software module 111 for further revision and modification based on the information received from the media players 120, the input device 101, and/or media playback point attribute 102. Media players 120, which is the playback endpoints, may send reports containing the results of playbacks to the advertising software system 110. The reports may be used to further revise the playback plans and to reconstruct optimal playback plans. In an embodiment, the media playback endpoints 120 may assign the playback information or weights obtained from each playback endpoint 120 to the corresponding media playback point attribute 102. These processes may be performed in an integrated software module in the advertising software system 110, or may be performed by software modules interrelated each other in the advertising software system 110.

As the advertising environment at the media playback endpoints may be continuously changing, the processes of constructing playback plans, evaluating playbacks and reconstructing playback plans as described above may repeat at predetermined time period, forming a continuous loop, to provide optimum advertising campaign at each media playback endpoint. This continuous loop may be referred to as an evaluation process. Information from the media playback endpoints, which may be a form of weighting statistics, may be stored as media playback point attributes.

Data storage for weighting statistics across time for each playback endpoint at some constant atomic interval may be provisioned. The atomic interval for storage of weighting statistics for each playback endpoint may be small relative to the timescales requested for fulfilment of media playback requests. As shown in FIG. 3, the information of the media playback point attribute 302, such as date and hours availability (future availability), other advertising weighting statistics and advertising network participation information, is received from or transferred to the media player 310. The information of the media playback point attribute 302, which is referred to as weighting statistics, is used to build playback plans in the advertising system 301. Initial tests indicate one minute intervals may be suitable if the weighting statistics represents only audience measurement information in the form of average minute audience, and no additional or different weight is required, for instance.

The minimum required timeframe for data storage for weighting statistics comprises the present moment including and through a time after which no currently requested advertising playback may occur. Thus, sufficient amount of data may need to be input into the advertising system to enable insight into the future weighting statistics from the present moment until the end date and time for the last requested advertising playback timeframe in chronological order.

The accuracy of the stored weighting statistics data need not be perfect. Notably, the more accurate the stored data is at any moment, the better the system will perform overall. The accumulation of stored weighting statistics data need not be a one-time event, and may occur as frequently as necessary to achieve a desired accuracy over time. The manner of accumulation for stored weighting data need not be specified, nor is it required to remain constant. It may be composed of something as simple as manual data entry, or come from any suitable source including, but not limited to automatically imported data, predictive regression models, physical or optical sensors or counters, or external machine learning systems.

Figure 7:
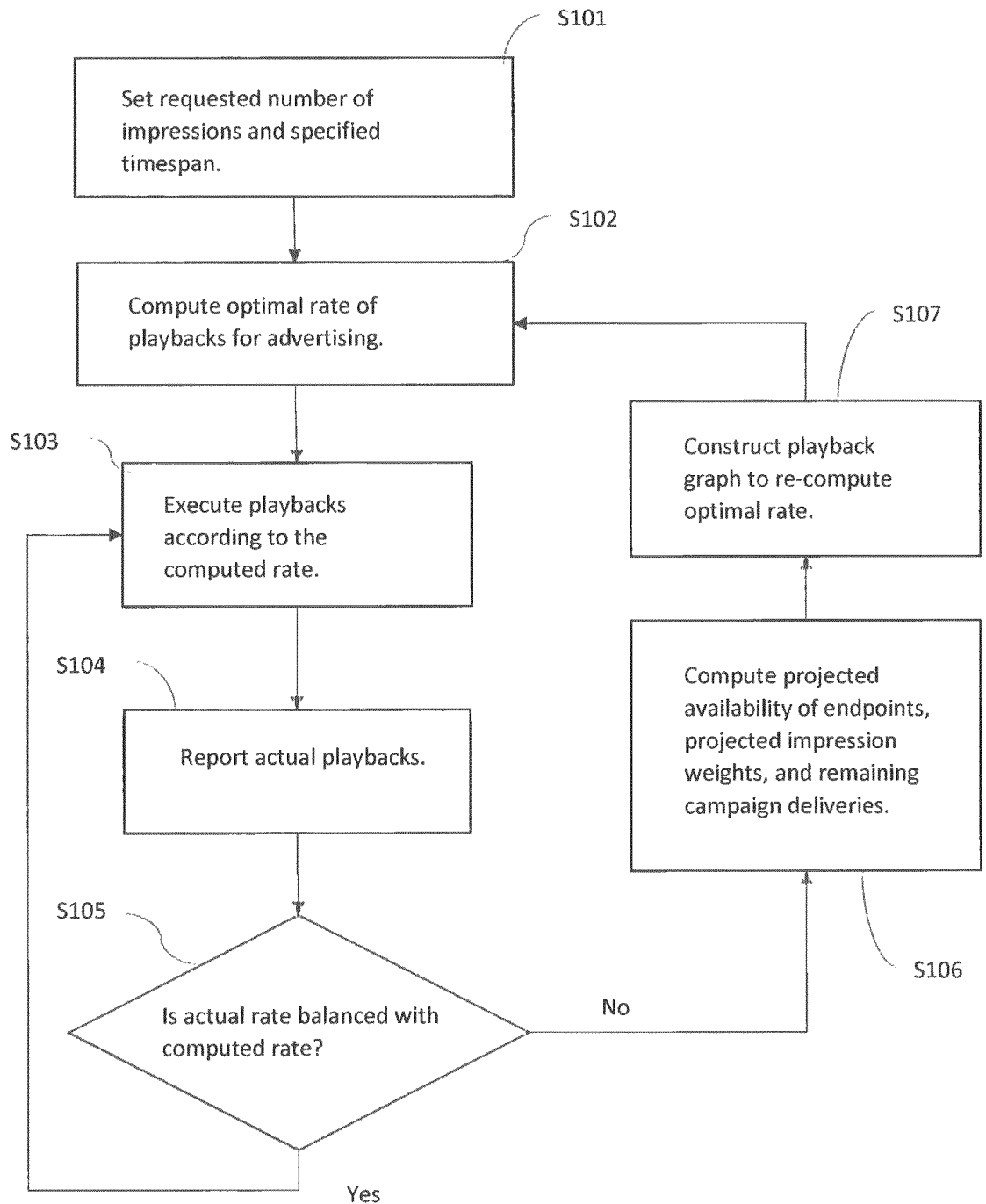
FIG. 7 shows a flowchart for optimizing the process of advertising.

FIG. 7 shows a flowchart for optimizing the process of advertising described above. Requests including number of impressions and specified timespan for each playback endpoint is set (S101). The requests may be entered by users or from the media playback endpoints. An optimal playback plan for advertising is computed (S102). The optimal playback plan may include optimal rate of playbacks for the endpoint. Playbacks at the endpoint according to the computed rate is executed (S103). Actual playbacks at the endpoint is reported to the advertising system (S104). The advertising system examines whether the actual playbacks is balanced with the computed rate of the optimal playback plan (S105). If the actual playbacks is balanced with the computed rate, the advertising system continuously executes the playback according to the current plan. Herein, the actual playback may be determined as balanced if the actual rate of playbacks is within a predetermined range from the computed rate of the optimal playback plan. If the actual playbacks is not balanced with the computed rate, information such as projected availability, projected impression weights, and remaining campaign deliveries at the endpoint are computed (S106). A new playback graph or new playback list is constructed (S107) according to the result of the step S106, and an optimal playback plan including optimal rate is re-constructed (S102). This processes form a continuous loop to optimize the advertising playback at each endpoint.

The system may optionally maintain a record of some or all weighting statistics before the present moment, for comparison to data which it will capture later in the process. However, this data may not be inherently necessary for operation of the present invention.

Examples of other weighting statistics which may advantageously, for effect, substitute for or further modify audience measurement information should require parallel storage. Such examples may include, but are not limited to, weather forecast information in the form of temperature or rain chance, local household income data, population density statistics, tourism rates, and local demographic information. These additional weighting statistics may or may not provide whole or partial replacement, scalar, or other formulaic modification of the weight in the event that they are both relevant to a given playback request and chosen by users of the software to participate in weighting decisions for that same playback request at the sole discretion of the users, given the presence of said mechanisms' data for any set of playback endpoints.

Data storage for future availability of media playback endpoints may be provisioned at the same constant atomic interval as that of weighting statistics data. Data storage for future availability of media playback endpoints may take the values "available" or "unavailable."

User requests for advertising playback may be comprised of the identification of one or more media elements, a target number of weight units, usually represented as impressions, a target set of media playback endpoints, a target set of date-time ranges, and selective options for modifying which parallel stored weight, endpoint selection, or availability data applies to the request.

Figure 4:
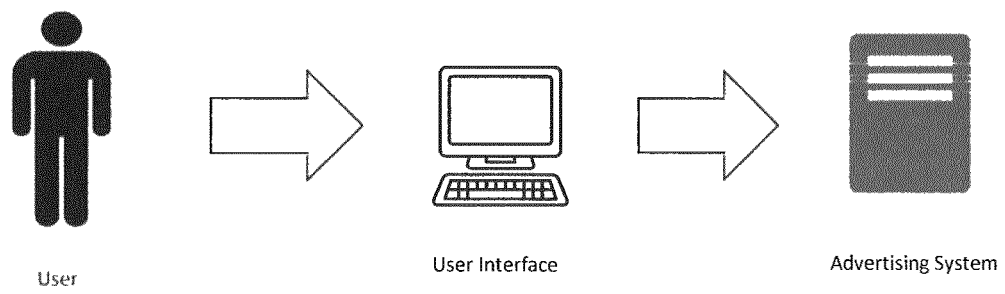
FIG. 4 shows a diagram of user requests for advertising playback of the present invention.
Figure 5:
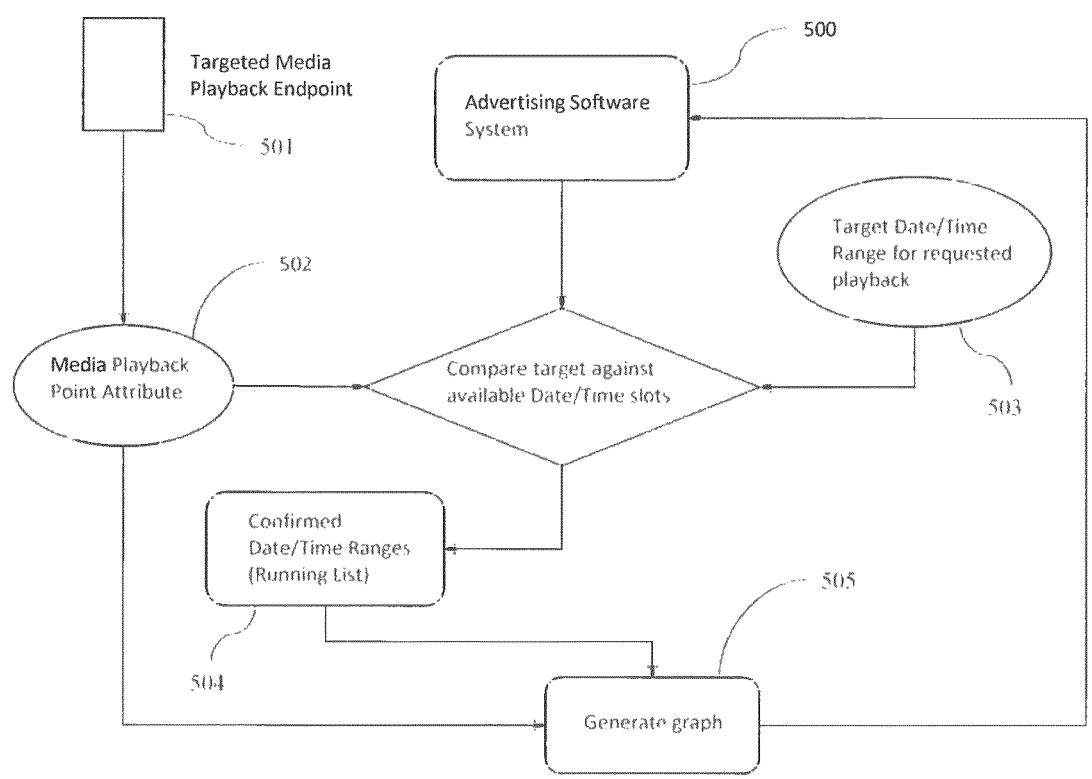
FIG. 5 shows a diagram of an advertising playback planning process of the present invention.

Another embodiment of the disclosed advertising system includes an interface for collection of user requests for advertising playback. As presented schematically in FIG. 4, users may be allowed to input requests for advertising playback through a user interface that is coupled to the advertising system. For example, as shown in FIG. 5, for each request for advertising playback, each targeted media playback endpoint 501 and each targeted date-time range 503, the system may check the targeted date time range against the "available" state of the future availability of the targeted media playback data endpoint stored in the media playback point attribute 502 using all methods in storage which match the selected options of the input user requests. This may create zero, one, or more intersected confirmed date-time ranges 504.

Intersected confirmed date-time ranges may be added to a running list for the targeted media playback endpoint. For each intersected confirmed date-time range, the system may apply the intersected confirmed date-time range to any of the weighting statistics data types which match the selected options. The portions of weighting statistics data within the date-time range may be added to a running graph 505 (or running list) of media playback endpoint-specific weighting for the request for advertising playback. The generated graph is sent to the advertising software system 500 to construct an optimal playback plan according to the input user requests. There may be a no-overlap example. In addition, the system may store a "delivered media playback endpoint weight" value for this media playback endpoint and request for advertising playback, initially zero.

For each resulting graph of media playback endpoint-specific weighting, the system may add all weighting statistics data to a running graph of request-specific weighting for the request for advertising playback. Where overlap occurs, the system may calculate and store the sum of the existing and new values and instruct the digital media playback network to prepare for future playback of the selected media elements on the selected media playback endpoints using methods appropriate to that system. Further a "delivered request weight" value may be stored for the request for advertising playback, initially zero.

Figure 8:
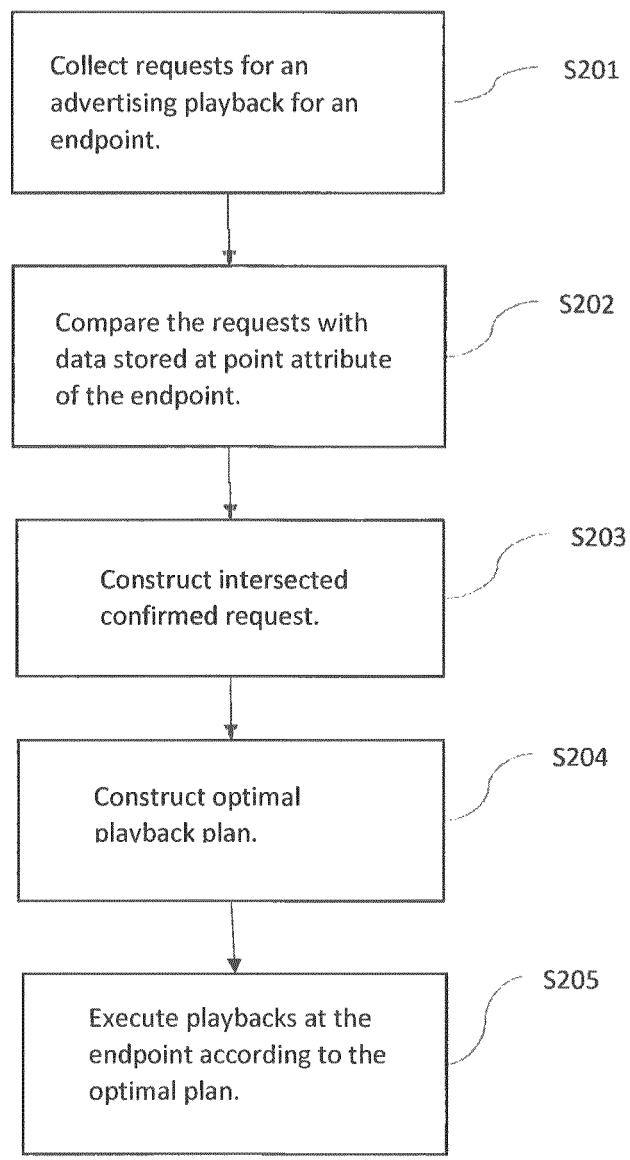
FIG. 8 shows a flowchart for optimizing the advertising according to an input request.

Referring to FIG. 8, user requests for an advertising playback for an endpoint is collected (S201). The selected options of the user requests are compared with data or information stored at media playback point attribute for the endpoint (S202). As a result of the comparison, an intersected confirmed request is constructed (S203). With this intersected confirmed request, an optimal playback plan for the endpoint is constructed (S204). Then, playbacks at the endpoint according to the optimal plan is executed (S205).

In another embodiment, on some potentially configurable interval, in either a pull or push model, an advertising request is generated by each targeted media playback endpoint. When this occurs, for each stored request for advertising playback, the system may consult the weighting statistics data which match the selected options in the request for advertising playback for the targeted media playback endpoint corresponding to the present moment as the ad request weight. The advertising system may also determine the progress of the request for advertising playback with respect to the targeted media playback endpoint by several steps. One of such steps may be construction of a running sum of weighting statistics data from the beginning of the graph of media playback endpoint-specific weighting up until the present moment with scalar addition of any previous weighting which occurred before the last graph re-computation. Another step may be construction of or, because it has not changed, recall of a computed sum of all weighting statistics data in the graph of media playback endpoint-specific weighting with scalar addition of any previous weighting which occurred before the last graph re-computation. Yet another step may be computation of the ratio between the two.

Further, the system may multiply the progress of the request for advertising playback with respect to the targeted media playback endpoint by the target number of weight units in the request for advertising playback. If this number is less than the delivered media playback endpoint weight, then this request for advertising playback represents a candidate for playback. If candidacy has not been determined, the system may perform similar progress steps using request-specific weighting data. If this weighted progress of the request for advertising playback with respect to the request is sufficiently less than the delivered request weight, then this request for advertising playback represents a candidate for playback.

The system may then select from the candidates for playback, select one of the candidate's media elements by some method and compel the digital media playback network to play the selected media element. If the digital media playback network deterministically successfully plays the selected media element, the ad request weight may be added to the associated delivered media playback endpoint weight and delivered request weight values.

Figure 9:
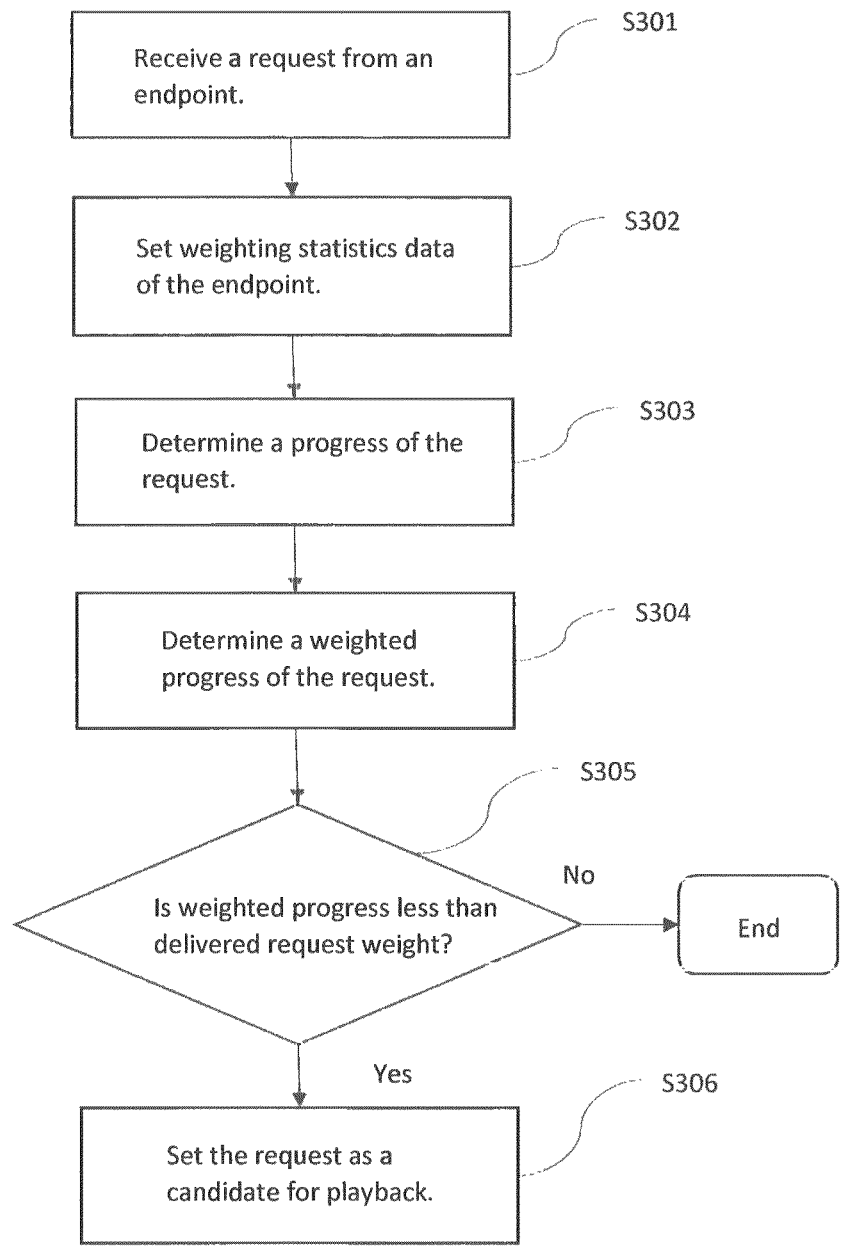
FIG. 9 shows a flowchart for optimizing the advertising according to an endpoint request.

Referring to FIG. 9, a request generated by each targeted media playback endpoint is received from an endpoint (S301). Weighting statistics data of the endpoint is set from the request (S302). A progress of the request is determined (S303). A weighted progress of the request is determined (S304). Then, if the weighted progress is less than delivered request weight (S305), the request is set as a candidate for playback (S306).

Figure 6A:
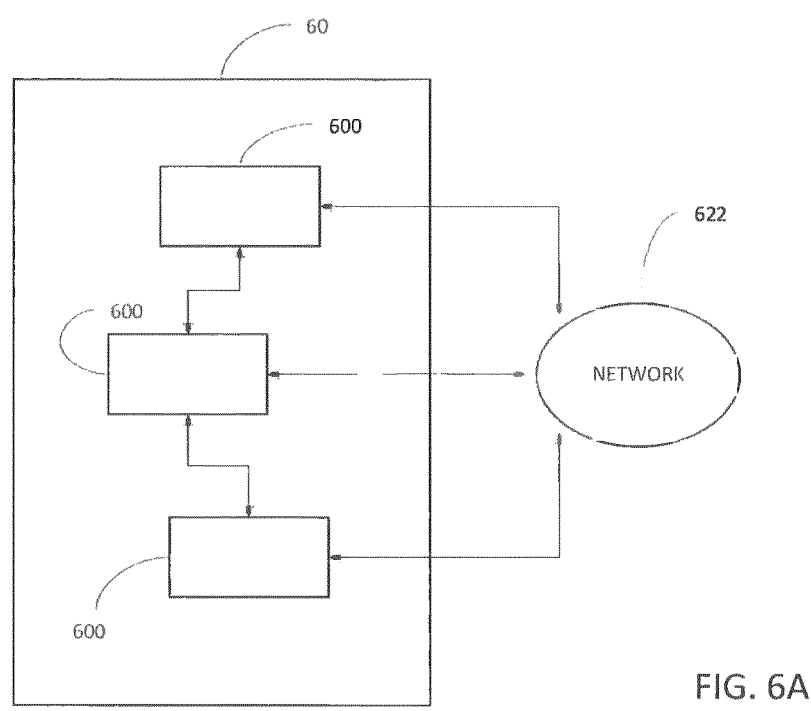
FIG. 6A shows a block diagram illustrating an advertising system for implementing the location-based advertising system.

A block diagram of FIG. 6A illustrates a location-specific advertising system 60 that includes one or more networked computing devices or systems 600. The advertising system 60 may include at least one computing device 600 to make the connections and/or run the processing on multiple client or otherwise networked computing devices 600. Computing device 600, including client-servers combining multiple computer systems, or other computer systems similarly configured, may include and execute one or more software modules or subsystem components to perform functions described herein, including steps of methods and processes described above.

Figure 6B:
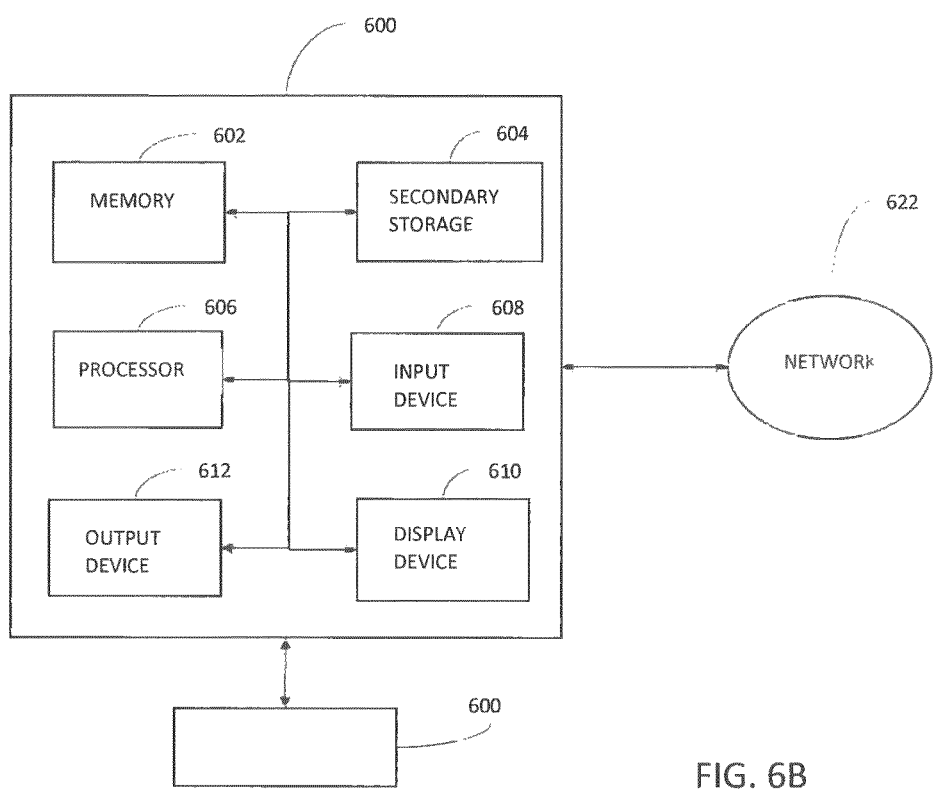
FIG. 6B shows a block diagram illustrating a computing device of the advertising system.

Computing device 600 may be connected with network 622, e.g., Internet, or other network, to receive inquires, obtain data, and transmit information and incentives as described above. As shown in FIG. 6B, computing device 600 typically includes a memory 602, a secondary storage device 604, and a processor 606. Computing device 600 may also include a processor or a plurality of processors 606, and be configured as a plurality of, e.g., bladed servers, or other known server configurations. Computing device 600 may also include an input device 608, a display device 610, and an output device 612. Memory 602 may include RAM or similar types of memory, and it may store one or more applications for execution by processor 606.

Secondary storage device 604 may include a hard disk drive, CD-ROM drive, or other types of non-volatile data storage. Processor 606 executes the application(s), such as software modules or subsystem components, which are stored in memory 602 or secondary storage 604 or received from the Internet or other network 622. The processing by processor 606 may be implemented in software, such as software modules, for execution by computers or other machines. These applications, including each software module or other subsystem component, preferably include instructions executable to perform the system, software module and subsystem component (or application) functions and methods described above and illustrated in the herein. The applications preferably provide graphical user interfaces (GUIs) through which users may view and interact with subsystem components (or application in a mobile device).

Computing device 600 may store one or more database structures in secondary storage 604, for example, for storing and maintaining databases and other information necessary to perform the above-described methods. Alternatively, such databases may be in storage devices separate from subsystem components. Also, as noted, processor 606 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device 608 may include any device for entering information into computing device 600, such as a touch-screen, keyboard, mouse, cursor-control device, touch-screen, microphone, digital camera, video recorder or camcorder. The input device 608 may be used to enter information into GUIs during performance of the methods described above. Display device 610 may include any type of device for presenting visual information such as, for example, a computer monitor or flat-screen display (or mobile device screen). The display device 610 may display the GUIs and/or output from sub-system components (or application). Output device 612 may include any type of device for presenting a hard copy of information, such as a printer, and other types of output devices include speakers or any device for providing information in audio form.

Examples of computing device 600 include dedicated server computers, such as bladed servers, personal computers, laptop computers, notebook computers, palm top computers, network computers, smart phones, mobile devices, or any processor-controlled device capable of executing a web browser or other type of application for interacting with the system.

The memory 602 of the computing device may store a computer executable instruction, and the processor 606 may execute the computer executable instruction that causes the computing device 600 to perform operations to process the advertising to the media playback endpoints. As described above, the operations include steps of steps of setting a user request for the advertising at the media playback endpoints, constructing an optimal playback plan for the advertising according to the user request, compelling the media playback endpoints to execute playbacks of advertising according to the optimal playback plan, evaluating playbacks of the advertising at the media playback endpoints, reconstructing the optimal playback plan based on a result of said evaluating playbacks, and re-compelling the media playback endpoints to execute playbacks of advertising according to the reconstructed optimal playback plan.

Although only one computing device 600 is shown in detail, system and method embodiments described herein may use multiple computer systems or servers as necessary or desired to support the users and may also use back-up or redundant servers to prevent network downtime in the event of a failure of a particular server. In addition, although computing device 600 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, or CD-ROM; or other forms of RAM or ROM. The computer-readable media may include instructions for controlling a computer system, computer 600, to perform a particular method, such as methods described above.

Although the various systems, modules, functions, or components of the present invention may be described separately, in implementation, they do not necessarily exist as separate elements. The various functions and capabilities disclosed herein may be performed by separate units or be combined into a single unit. Further, the division of work between the functional units can vary. Furthermore, the functional distinctions that are described herein may be integrated in various ways.

The foregoing description and examples have been set forth merely to illustrate the invention and are not intended to be limiting. Each of the disclosed aspects and embodiments of the present invention may be considered individually or in combination with other aspects, embodiments, and variations of the invention. Modifications of the disclosed embodiments incorporating the spirit and substance of the invention may occur to persons skilled in the art and such modifications are within the scope of the present invention.

What is claimed is:

1. An advertising system that provides digital advertising to out-of-home physical venues through one or more location-based media playback heterogeneous networks, comprising:
   a plurality of location-based media player devices at the out-of-home physical venues at media playback endpoints of the one or more location-based media playback heterogeneous networks, wherein the media player devices are configured to display contents of the advertising to audience and are configured to send reports of actual playbacks of the advertising at media player devices; and
   at least one computing device coupled to the media player devices through the media playback networks, the computing device comprising:
      a memory to store a computer executable instruction; and
      a processor to execute the computer executable instruction that causes said at least one computing device to perform operations to process the advertising to the media playback endpoints, the operations comprising:
         setting a user request for the advertising at the media playback endpoints;
         constructing an optimal playback plan for the advertising according to the user request;
         compelling the media player devices at the media playback endpoints to execute playbacks of advertising according to the optimal playback plan;
         receiving the reports of actual playbacks from the media player devices;
         evaluating playbacks of the advertising at the media playback endpoints based on the actual playbacks, wherein said evaluating playbacks further comprises:
            computing a projected future availability of each of the media playback endpoints;
            computing a projected impression weight of each of the media playback endpoints;
            computing a remaining advertising playback timespan of each of the media playback endpoints; and
            storing the projected future availability and the projected impression weight as a function of the remaining advertising playback timespan;
         determining gaps between the playback plan and the actual playbacks of each of the media player devices, which are generated by unpredictable hardware and software failures inherently anticipated in the one or more location-based media playback heterogeneous networks;
         reconstructing the optimal playback plan based on a result of said evaluating playbacks and said determining gaps to balance out the failures, and re-compelling the media player devices at the media playback endpoints to execute playbacks of advertising according to the reconstructed optimal playback plan; and
         repeating said receiving the reports of actual playbacks, said evaluating playbacks of the advertising, said determining gaps, said reconstructing the optimal playback plan, and said re-compelling the media player devices at a predetermined time period to continuously measure and compensate for the gaps between the playback plan and the actual playbacks.

2. The advertising system of claim 1, wherein the user request includes a target set of media playback endpoints, a targeted date-time range for each endpoint of the target set of media playback endpoints, an impression weight for each endpoint of the target set of media playback endpoints, and a media element for each endpoint of the target set of media playback endpoints.

3. The advertising system of claim 1, wherein the optimal playback plan includes an optimal rate of playback at each endpoint of the media playback endpoints.

4. The advertising system of claim 1, wherein the reports include actual rates of playbacks and timings of playbacks.

5. The advertising system of claim 1, wherein said evaluating playbacks further comprises continuously measuring the gaps in which playback of advertising fails at each of the media playback endpoints.

6. The advertising system of claim 1, wherein said evaluating playbacks further comprises collecting and storing weighting statistics data including future audience measurements and future availabilities of the media playback endpoints.

7. The advertising system of claim 6, wherein the weighting statistics data further includes weather forecast, local household income data, population density statistics, tourism rates, local demographic information, or combination thereof.

8. The advertising system of claim 6, wherein said collecting the weighting statistics data is performed by manual data entry, automatically imported data, predictive regression model, physical or optical sensor, counters, external machine learning systems, or combination thereof.

9. The advertising system of claim 6, wherein said at least one computing device further comprises a secondary storage in which the weighting statistics data is stored.

10. The advertising system of claim 1, said evaluating playbacks further comprises repeating said computing and storing the projected future availability and the projected impression weight at a predetermined time interval.

11. The advertising system of claim 1, wherein said reconstructing the optimal playback plan utilizes the projected future availability and the projected impression weight to reconstruct the optimal plan.

12. The advertising system of claim 1, wherein said at least one computing device further comprises an input device through which the user request is entered.

13. A method for providing digital advertising to out-of-home physical venues through one or more location-based media playback heterogeneous networks, comprising:
   setting a user request for the advertising at the media playback endpoints, wherein the out-of-home physical venues at the media playback endpoints of the one or more location-based media playback networks include a plurality of location-based media player devices that are configured to display contents of the advertising to audience and are configured to send reports of actual playbacks of the advertising at media player devices;
   constructing an optimal playback plan for the advertising according to the user request;
   compelling the media player devices at the media playback endpoints to execute playbacks of advertising according to the optimal playback plan;
   receiving the reports of actual playbacks from the media player devices;

evaluating playbacks of the advertising at the media playback endpoints based on the actual playbacks, wherein said evaluating playbacks further comprises:
  computing a projected future availability of each of the media playback endpoints;
  computing a projected impression weight of each of the media playback endpoints;
  computing a remaining advertising playback timespan of each of the media playback endpoints; and
  storing the projected future availability and the projected impression weight as a function of the remaining advertising playback timespan;
determining gaps between the playback plan and the actual playbacks of each of the media player devices, which are generated by unpredictable hardware and software failures inherently anticipated in the one or more location-based media playback heterogeneous networks;
reconstructing the optimal playback plan based on a result of said evaluating playbacks and said determining gaps to balance out the failures, and re-compelling the media player devices at the media playback endpoints to execute playbacks of advertising according to the reconstructed optimal playback plan; and
repeating said receiving the reports of actual playbacks, said evaluating playbacks of the advertising, said determining gaps, said reconstructing the optimal playback plan, and said re-compelling the media player devices at a predetermined time period to continuously measure and compensate for the gaps between the playback plan and the actual playbacks.

14. The method of claim 13, wherein said setting the user request further comprises:
  setting a target set of media playback endpoints;
  setting a date-time range for each endpoint of the target set of media playback endpoints;
  setting an impression weight for each endpoint of the target set of media playback endpoints; and
  identifying a media element for each endpoint of the target set of media playback endpoints.

15. The method of claim 13, wherein the optimal playback plan includes an optimal rate of playback at each endpoint of the media playback endpoints.

16. The method of claim 15, wherein said constructing the optimal playback plan further comprises computing the optimal rate of playback from the impression weight of each of the endpoint.

17. The method of claim 13, wherein the reports include actual rates of playbacks and timings of playbacks.

18. The method of claim 13, wherein said evaluating playbacks further comprises continuously measuring the gaps in which playback of advertising fails at each of the media playback endpoints.

19. The method of claim 13, wherein said evaluating playbacks further comprises collecting and storing weighting statistics data including future audience measurements and future availabilities of the media playback endpoints.

20. The method of claim 19, wherein the weighting statistics data further includes weather forecast, local household income data, population density statistics, tourism rates, local demographic information, or combination thereof.

21. The method of claim 19, wherein said collecting the weighting statistics data is performed by manual data entry, automatically imported data, predictive regression model, physical or optical sensor, counters, external machine learning systems, or combination thereof.

22. The method of claim 13, said evaluating playbacks further comprises repeating said computing and storing the projected future availability and the projected impression weight at a predetermined time interval.

23. The method of claim 13, wherein said reconstructing the optimal playback plan utilizes the projected future availability and the projected impression weight to reconstruct the optimal plan.

24. A method for providing digital advertising to out-of-home physical venues through one or more location-based media playback heterogeneous networks, comprising:
  collecting a request for an advertising playback for a targeted media playback endpoint, wherein the out-of-home physical venue at the targeted media playback endpoint of the one or more location-based media playback networks includes one or more location-based media player devices that are configured to display contents of the advertising to audience and are configured to send reports of actual playbacks of the advertising at media player devices;
  comparing the request with a point attribute of the targeted media playback endpoint;
  constructing an intersected confirmed request from the request, wherein the intersected confirmed request matches the point attribute of the targeted media playback endpoint;
  constructing an optimal playback plan for the advertising according to the intersected confirmed request; and
  compelling the media player devices at the targeted media playback endpoint to execute playbacks of advertising according to the optimal playback plan;
  receiving the reports of actual playbacks from the media player devices;
  evaluating playbacks of the advertising at the media playback endpoints based on the actual playbacks, wherein said evaluating playbacks further comprises:
    computing a projected future availability of each of the media playback endpoints;
    computing a projected impression weight of each of the media playback endpoints;
    computing a remaining advertising playback timespan of each of the media playback endpoints; and
    storing the projected future availability and the projected impression weight as a function of the remaining advertising playback timespan;
  determining gaps between the playback plan and the actual playbacks of each of the media player devices, which are generated by unpredictable hardware and software failures inherently anticipated in the one or more location-based media playback heterogeneous networks;
  reconstructing the optimal playback plan based on a result of said evaluating playbacks and said determining gaps to balance out the failures, and re-compelling the media player devices at the targeted media playback endpoint to execute playbacks of advertising according to the reconstructed optimal playback plan; and
  repeating said receiving the reports of actual playbacks, said evaluating playbacks of the advertising, said determining gaps, said reconstructing the optimal playback plan, and said re-compelling the media player devices at a predetermined time period to continuously measure and compensate for the gaps between the playback plan and the actual playbacks.

25. The method of claim 24, wherein the request includes a target set of media playback endpoints, a targeted date-time range for each endpoint of the target set of media playback endpoints, an impression weight for each endpoint of the target set of media playback endpoints, a chosen media element for each endpoint of the target set of media playback endpoints, or combinations thereof.

26. The method of claim 24, wherein the point attribute of the targeted media playback endpoint includes a future availability and an advertising network's participation information.

27. The method of claim 26, wherein the request includes a targeted date-time range, and said comparing the request with a point attribute of the targeted media playback endpoint further comprises comparing the targeted date-time range with the future availability of the targeted media playback endpoint.

28. The method of claim 24, further comprising constructing request-specific weighting statistics data by applying the intersected confirmed request to weighting statistics data of the targeted media playback endpoint.

* * * * *